United States Patent [19]
Gibbs

[11] 3,878,349
[45] Apr. 15, 1975

[54] DIRECT CURRENT CONTROL MEANS
[75] Inventor: James Whitman Gibbs, Hialeah, Fla.
[73] Assignee: John Welsh, Green Township, Ohio
[22] Filed: Aug. 2, 1973
[21] Appl. No.: 385,067

[52] U.S. Cl. .................................. 200/209; 318/139
[51] Int. Cl. ............................................ H01h 29/18
[58] Field of Search .......... 200/185, 187, 206, 209, 200/210, 81.9 HG, 82 R, 82 C; 318/139

[56] References Cited
UNITED STATES PATENTS
| | | | |
|---|---|---|---|
| 2,047,902 | 8/1936 | Eitzen | 200/209 |
| 2,907,614 | 10/1959 | Rosen | 92/206 |
| 3,142,739 | 7/1964 | Grupen | 200/210 |

Primary Examiner—Robert K. Schaefer
Assistant Examiner—Morris Ginsburg
Attorney, Agent, or Firm—Hamilton, Renner & Kenner

[57] ABSTRACT

An electric current control unit to be placed electrically between a current source and an electrically driven member to regulate energy flow from the source. The unit includes a piston head and cylinder of non-conductive material and, in the piston head, an annular ring of an electrically conductive material is carried. A plurality of axially spaced discrete electrically conductive segments are arranged in the cylinder wall. Circuit means connect the source and each of the segments through an impedance element which offers a different resistance to the current flow from the source to each segment. A conductor means connects the piston head ring, which is preferably mercury, with the electrical unit or member to be driven. When the piston is moved through the cylinder, it successively makes contact with the segments to permit current to flow from the source. Preferably a balance circuit is provided which electrically connects the mercury ring and one of electrical segment, the one which is axially adjacent to the top normal position of the piston. The balance circuit includes a switch that is normally open but, on initiation of movement of the piston, is closed by mechanical means, so that as the ring in the piston head makes initial contact with the first segment, a component of current flow takes place from the top segment to the piston head ring which overcomes arcing problems.

19 Claims, 1 Drawing Figure

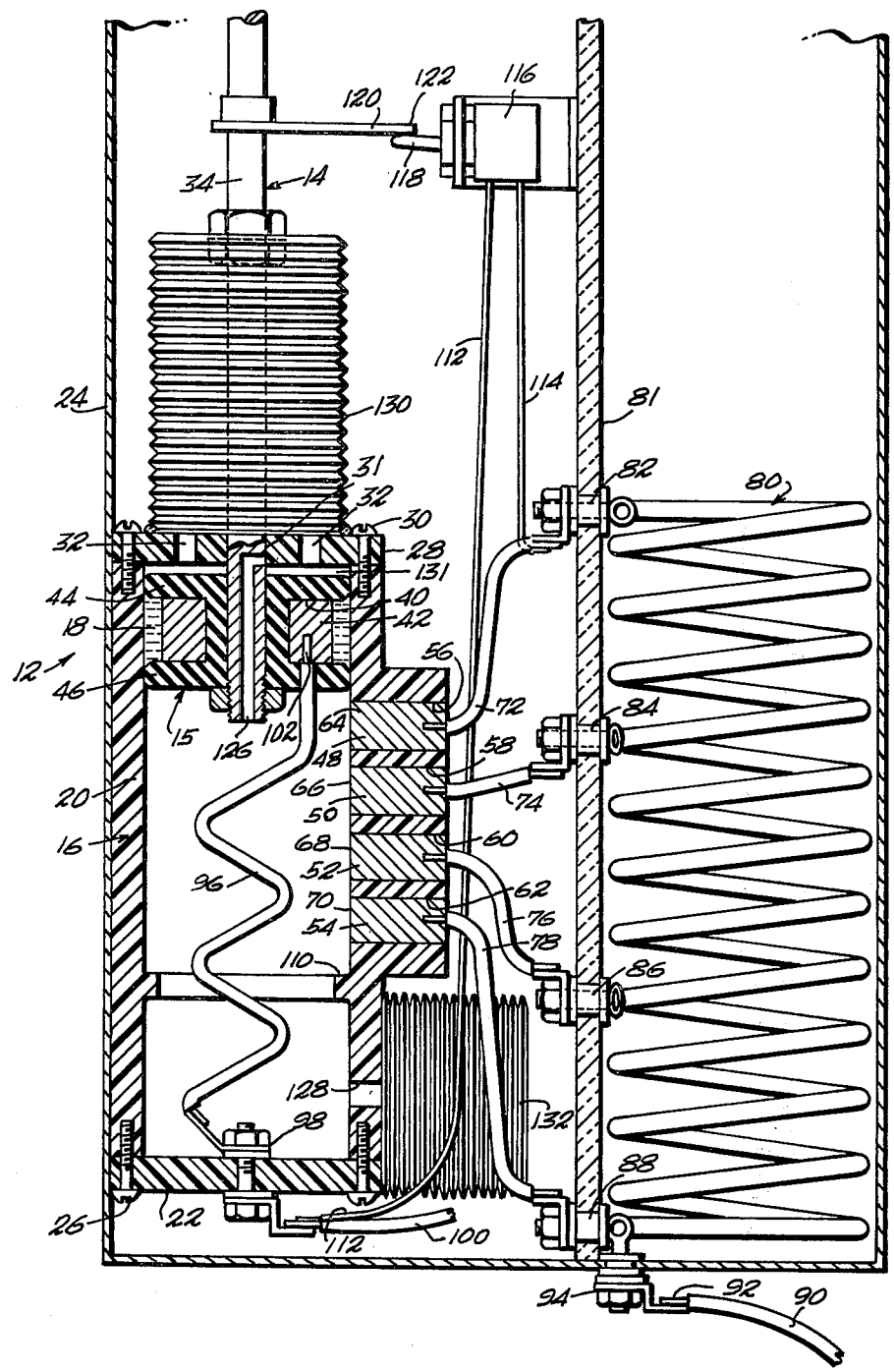

3,878,349

DIRECT CURRENT CONTROL MEANS

FIELD OF THE INVENTION

This invention relates to a current control means for regulating the flow of energy or current from a current source to a unit to be energized; and, more particularly, to an improved unit for controlling such current flow which is preferably characterized by a balance circuit to eliminate arcing when energy flow is initiated.

BACKGROUND OF THE INVENTION

As is perhaps well known, many motors, for example, are driven by direct current from a source, such as a bank of batteries. Oftentimes small vehicles are run on such energy; however, there has been a problem in providing a smooth current flow to the motor of such a vehicle or other device. This is true of A.C. motors also. As a result, the operation of many such vehicles and devices are not smooth and this is because there is not a means for smoothly varying the energy flow to the driven unit. For example, many golf carts although operated by direct current sources are considered unsafe by many older persons because of lack of smoothness in the control means which the driver employs in regulating the current flow and, consequently, the energy delivered to the vehicle.

OBJECTS OF THE INVENTION

It is an object of this invention as exemplified by the hereinafter described embodiment to provide an improved control unit for regulating the flow of current from a source to a unit to be driven by the energy and which unit in operation customarily requires a range of current flow or energy demand.

It is another object of this invention to provide a manually operable control unit to regulate current flow from a current source to a device operable upon energization by said current which includes (a) a plurality of electrical contacts connected to current source means and adapted to deliver to each of the contacts a different current flow, (b) in which said contacts comprise spaced portions of an otherwise non-conductive slide surface, (c) a sliding non-conductive surface which carries a captivated pool of electrically conductive material into and out of an electrical engagement serially with the contacts of the slide surface on movement of the slide member, (d) circuit means which connect the pool to the device to be energized, and (e) preferably, a balance circuit means which connects the pool with the first electrical contact in the line of travel of the slide member which counteracts arcing on initiation of sliding movement and current flow, the balance circuit avoiding problems of arcing.

It is another and more specific object of this invention to provide a slide member of non-conductive material which carries with it a captivated ring mercury which serves as a movable electrical switch contact and a slide surface with spaced electrical contacts connected to current source means including an impedence element so that the current delivered to each of the contacts, is different, and in which a balance circuit means may be provided, as described hereinafter, to provide means to overcome problems of arcing upon initiation of movement of the movable contact into engagement with the first contact in the line of travel.

While the instant invention has been described in accordance with a preferred embodiment illustrated in the drawings, it will be recognized that departures may be made therefrom within the scope of the claims which are appended following the detailed description of the invention; and that it is a general object of this invention to provide an improved switching means for controlling current flow from a direct current source means to a unit to be driven which includes balance circuit means to overcome arcing problems and that, accordingly, this invention is to be awarded the full scope of the claims.

The instant invention will now be described with reference to the accompanying drawings in which:

DESCRIPTION OF THE DRAWING

The FIGURE is a view in cross section illustrating the arrangement of a preferred embodiment of the instant invention.

DETAILED DESCRIPTION OF THE DRAWING

Referring to the drawing, like reference characters designate like or corresponding parts of the electrical control unit throughout the several views. The unit 12 will first be described generally. In a preferred and illustrated embodiment, it comprises a piston 14 with a head 15 reciprocally arranged in a cylinder 16 for reciprocable movement to control of current flow in a circuit means from a current source. The piston surface may be regarded as a slide member. Generally, on movement of the piston, a captivated ring of flowable conductive material 18, carried in the piston head, is brought successively into electrical contact with electrical leads or segments axially arranged along the interior surface of the cylinder wall, or suitably configured slide surface companionate to the slide member surface. This permits current to flow through the circuit means in a quantity which is dependent upon the location of the ring carrying piston head relative to the electrical contacts in the cylinder, each of which is in series with a separate impedence means. In the following paragraphs, the structure of a preferred embodiment of the unit will be described first, to be followed by description of the electrical circuit; and thence, a description of the operation will be set forth.

Referring to the piston and cylinder assembly, it is seen that the interior of the cylinder 16 is of non-conductive material 20, which in the preferred embodiment may be secured to the housing 24 by suitable means, such as an adhesive. The bottom 22 of the cylinder also is of similar non-conductive material, such as rubber, and is secured to the cylinder wall as at 26. The upper end of the cylinder is provided with a cap 28 secured thereto, as at 30, the cap having a central through hole 31 and passageway means 32, which are for a purpose which will be explained in connection with the piston rod to allow for displacement of fluid upon movement of the piston in the subsequent description of the operation.

Referring to the piston 14, it includes a rod 34 having one end at all times exterior of the cylinder and a head 15 connected to the interior rod end, with the intermediate rod portion of the rod slidably extending through the hole 31 in the cap 28 of the cylinder cap.

The piston head 15 is also of non-conductive material and snugly, but slidably, fits in the cross section of the cylindrical barrel. In the wall of the head 15, an annular recess 40 is provided, which in the preferred embodiment is an annular groove. Within this recess a movable electrical contact, now to be described is carried. In the preferred embodiment in the innermost portion of the recess 40, there is provided a carbon plug or ring 42 which defines an outer or peripheral chamber between its outboard surface and the piston working surface which is filled with mercury or other suitable electrically conductive liquid.

In operation, when the piston is moved axially, the captivated mercury is swept between the captivating wiper segments 44 and 46 on opposite sides of the pool into and out of successive electrical connection with the leads or segments 48, 50, 52 and 54, which form part of the barrel surface and which are in axially spaced relation with respect to one another. A suitable construction provides through holes 56, 58, 60, and 62 in the cylinder wall in which electrically conductive plugs, 64, 66, 68 and 70, preferably of carbon are securely seated; and into the exterior end of the plugs lead wires are connected, the same being designated by the numerals 72, 74, 76 and 78.

Each of these lead wires is connected to an impedence element, such as that indicated by the numeral 80. While separate impedance elements may be utilized, it is the preferred embodiment to use a single resistive element in spiral form as indicated, suitably carried by a frame 81 connected to the housing of the unit. The wires or leads are connected at axially spaced points along the resistive element, as at the connectors 82, 84, 86, and 88. The latter connector is connected to the impedance element at the point of least resistance to current flow from a source, not shown, but to which the input lead 90 is connected at one end and, at the other end 92, to a suitable electrical connector 94, which is connected to the impedence element. The lead 72, on the other hand, is connected at the point of substantially maximum resistance of the impedance element to current flow.

Thus, it is seen, that as the piston travels downwardly in the cylinder, it will successively contact the several electrical segments in the cylinder wall and permit a current component to flow through the leads dependent upon the impedance to the flow. As the piston moves from top dead center, as shown, the current will increase inversely to the impedence in the circuit path open by reason of the particular position of the liquid conductive pool in the piston head.

The variable current flow will then be available to drive an electrical unit, the flow taking place through an extendible lead wire 96 extending from the piston head to a connector 98 in the cylinder wall, below the piston head travel, and through the main electrical outlet line 100 to connect to a unit to be driven by the variable energy flow. The end 102 of the extendible conductor 96 is embedded or suitably connected to the carbon plug in the preferred embodiment illustrated.

Certain relative dimensions are of significance and these will now be referred to. It is seen that the axial dimension of the electrically conductive pool of liquid 18 is at least slightly greater than the axial dimension between the corresponding axial location of corresponding parts of the conductive plugs in the cylinder wall, so that, when the pool is located, for instance, between two adjacent plugs, a component of current will be permitted to flow through the associated electrical lead of each plug as the piston moves until such time as it is substantially opposite the plug. Additionally, in the preferred embodiment the dimension of the pool is such that, when it is located such that its lateral centerline is colinear with the lateral centerline of a plug, current will flow through that plug only. It is thus seen that when movement takes place in downward travel, except upon the initiation of the movement, there will be a gradual diminishing of the current component through the plug which is being left and a gradually increasing current component flow through the plug which is being approached. Additionally, stop means are provided, designated by the numeral 110, which limit travel of the piston away from the top dead center position, and the stop means are arranged relative to the pool and the associated axial piston head dimension of the leading edge of the piston travel away from the top dead center such that current will always be permitted to flow through the plug of minimum impedance so long as the piston is at the bottom of the stroke.

It will be generally recognized that arcing is apt to occur between the electrically conductive pool swept along by the piston head as it first approaches and makes electrical contact with the plug adjacent top dead center. The attendant problems of arcing are well known in the art and it has been found that these problems are substantially overcome in the instant invention. The structure employed for overcoming the effects of this problem comprise a balance circuit now to be described. The circuit comprises a switch 116 in series with or intermediate (a) a conductive wire 112 is connected at one end to the main electrical output of the unit, and (b) a conductive element 114 connected at one end to the connector or impedence element at the point of maximum resistance. By reason of this balance circuit, when the switch 116 is closed and the current flow is first initiated, it will be seen that there will be a current component flowing through the lead wire 114, switch 116, when it is closed, and through the wire 112 to the piston head returning to the connector 82 through the lead wire 72, which balances and overcomes the problems of arcing. The switch 116 is provided with a trigger 118 which cooperates with an arm 120 carried on the piston rod 14 at an axial location such that the distal end 122 of the arm will close the switch 116 upon initiation of movement of the piston head.

It is thus seen that a range of current flow may be selected by an operator by merely depressing the piston. It will be appreciated, however, that there will be a displacement of fluid in the cylinder, and to accommodate this, passageways are provided at the upper and lower end of the cylinder as at 126 and 128 each of which leads to an upper and lower expandable portion 130 and 132, such as bellows, into which the displaced fluid is adapted to flow. In the preferred embodiment, an axial passageway is provided in the terminal end of the piston rod 14 which communicates through a space 131 at top dead center with the passageways 32 which lead into the bellows or expandable member 130 which is sealingly connected to the cap about the passageways 32, as is the bellows 132 with respect to the passageway 128 below the piston head travel.

In a preferred embodiment, the stop means limiting the piston travel adjacent the lower portion of the cylinder may be frangible, so that an operator may be applying pressure to the piston through an operator means, interrupt all current flow to the device being energized by the current source means.

While this invention has been described in reference to a piston head traveling with respect to the cylinder wall, it will be appreciated by those skilled in the art that any type of slide surface of non-conductive material may be provided in which there are separate spaced electrical contacts arranged at fixed locations on the slide surface and defining a slide path which comprise part of the smooth surface, so that a movable contact or slide member with a main non-conductive surface and an electrically conductive segment, or pool captivated for movement with the slide member, may be brought into successive engagement with the fixed electrical contacts so that electrical current flowing from the source means will be controlled by the location of the segment or pool and, consequently, the delivered direct current. While in the preferred embodiment, a single impedence means is provided to which the electrical contacts are connected at predetermined points therealong, a plurality of separate current sources may be provided to deliver current to each of the contacts, such as from a bank of batteries connected in series, or from generator means, and with the lead wires from the contacts connecting to the posts of an appropriate batter of the bank.

The balance circuit is not required or may not be preferred where the voltage and current to the electrical lead adjacent the top dead center position is such that there are no objectionable arcing problems on initiation of contact by the pool or segment with that lead.

It will be seen that the portions of the periphery of the piston head on opposite sides of the pool serve as wiper means which captivate and move the mercury on movement of the piston; and to increase the wiper effect the portions on opposite sides of the pool may be provided with peripheral grooves to define what may be described as somewhat flexible or displaceable flap-type wiper means as the non-conductive material of the head wears. Additionally, adjustment means may be provided to expand the piston head diameter about the pool, such as that suggested by the V rings and adjustment means described in U.S. Pat. No. 2,907,614 and patents of that Class. It has been found that because mercury is quite flowable, in a preferred embodiment it may be thickened by a powdered metallic conductive material, such as a silver powder, which is thoroughly mixed with the mercury so as to provide an amalgam, which is perhaps not technically a liquid but for the purposes of this description is described as a pool. The amount of powder to be mixed with the mercury may be selected to provide the desired flowability and constituency of the amalgam. While the contacts along the slide surface may be copper, or brass, or other suitable material, it is also practical, and, therefore, a preferred embodiment to provide a coating of mercury, as by an electroplating process, to the exposed copper surface of the contact, or whatever material that conductive surface may be, so that the electrical contact at the surface of engagement between the slide surface and slide member is mercury to mercury.

What is claimed is:

1. An electrical control unit comprising:
   A. a cylinder defining a cylinder column of non-conductive material closed at one end and having a through hole at the other end,
   B. a piston rod having one end at all times exterior of the cylinder and snugly extending through said hole;
   C. a piston head, sized for snug reciprocal movement within the cylinder and of insulated material connected to said rod in said cylinder;
   D. a recess in the surface of the head confronting the cylinder,
   E. a pool of electrically conductive liquid in the recess, and having a portion comprising part of the surface of the side wall of the head;
   F. wiper means included in the head and captivating the pool to constrain it to movement with the piston head,
   G. a plurality of fixed and separate contacts in the piston wall, axially spaced with respect to one another, and comprising part of the surface of the cylinder column,
   H. means limiting the piston head to travel in said column between a first position with the pool out of engagement with any of the contacts and a second position with the pool in contact with the contact farthest from the first position, and permitting movement of the pool between said positions and into and out of engagement serially with said contacts;
   I. said pool being sized relative to said contacts, such that the axial dimension of the pool is as great as the distance between corresponding parts of adjacent contacts;
   J. circuit means connecting the contacts with an energy source means for current flow of a different voltage to each contact;
   K. a conductive circuit connected to the pool and extending exteriorly of the cylinder to connect to a unit to be driven by energy of variable voltage requirement to control current flow dependant on the location of the pool in the cylinder; and
   L. a balance circuit connected electrically to said pool and to the contact adjacent said first position to counteract arcing on movement of the pool from the first position into engagement with the adjacent electrical contact.

2. The device as in claim 1 wherein the cylinder is vented intermediate the means limiting and the wall of the cylinder outboard of the piston head travel path.

3. The device as set forth in claim 1 wherein the recess comprises an annular groove and the pool comprises a ring.

4. The device as set forth in claim 3 wherein the ring is of mercury.

5. The device as set forth in claim 1 wherein the contacts are in an axial line.

6. The device as set forth in claim 1 wherein there is fluid in the cylinder column.

7. The device as set forth in claim 1 wherein expandable chamber means are provided at each end of the cylinder between said positions to accommodate displacement of fluid in the cylinder on movement of the head, passageway means are provided communicating between the interior of the cylinder and the expandable chamber means; and sealing means are provided closing the cylinder and expandable chamber means.

8. The device as set forth in claim 7 wherein the expandable chamber means comprise a bellows about the piston rod and said passageway means comprises an axial bore in the piston rod for communication between the column of the cylinder and the bellows interior.

9. The device as set forth in claim 8 wherein bellows are provided on the cylinder wall outboard of the piston travel and the means limiting the travel of the piston head and said passageway means communicates through the wall of said cylinder.

10. Current control means comprising:
   A. a smooth slide surface of non-conductive material, and a plurality of separate, spaced, electrical contacts arranged at fixed locations on said slide surface between a first and a second position defining a slide path therebetween and with said contacts comprising portions of said smooth slide surface;
   B. a movable contact comprising a slide member having a main non-conductive surface;
   C. said non-conductive surface of said slide member having an electrically conductive pool of liquid comprising a part of the slide member surface and being flush with said main non-conductive surface;
   D. said slide member including wiper means captivating and constraining said pool to movement with said slide member;
   E. means constraining the slide member to engagement of the pool with said slide surface on movement of the slide member;
   F. means to guide movement of said slide member and captivated pool into and out of electrical engagement with said contacts on sliding movement of said slide member between said first position and said second position;
   G. said contacts being intermediate said positions in the slide path with corresponding portions adjacent the spaced contacts being spaced from one another a distance along the path of travel slightly less than the span of the pool along the slide path;
   H. stop means cooperating between the slide surface and member and adjacent said second position, said stop means being spaced from the adjacent electrical contact a distance such that when the slide member is in engagement with said stop means, the pool is in electrical engagement with said adjacent electrical contact;
   I. lead wires extending from each of said contacts and adapted to be electrically connected to a current source means characterized by a predetermined voltage;
   J. electrical lead wire means connecting said pool and adapted for connecting to an electrical unit to be driven by current;
   K. balance circuit means electrically interconnecting said pool and the contact adjacent said first position;
   L. said contact adjacent said first position being spaced from said first portion a distance greater than the span of the pool along the slide path; and
   M. whereby direct current flow may be initiated by a movement of the slide member and controlled by movement of said slide member toward said second position from contact to contact.

11. The device as set forth in claim 10 wherein the balance circuit means includes a normally open switch and means mutually intercooperating between the switch and the slide member and slide surface to close said switch on initiation of movement from the first position toward the contact adjacent said first position.

12. The device as set forth in claim 11 wherein said switch includes a trigger means and an arm on said slide member, said trigger means being in the path of travel of the arm on initiation of movement of the slide member to close said switch in said balance circuit means on movement of the slide member between said first position and prior to contact of said pool with said contact adjacent said first position.

13. The device as set forth in claim 10 wherein the slide surface comprises a cylinder column wall and said slide member comprises a piston.

14. Current control means comprising:
   A. a smooth slide surface of non-conductive material, and a plurality of separate, spaced, electrical contacts arranged at fixed locations on said slide surface between a first and a second position defining a slide path therebetween and with said contacts comprising part of said smooth slide surface;
   B. a movable contact comprising a slide member having a main non-conductive surface;
   C. said non-conductive surface of said slide member having an electrically conductive segment in the form of the pool of electrically flowable material comprising a part of the slide member surface and being flush with said main non-conductive surface;
   D. means constraining the slide member to sliding engagement of the segment with said smooth slide surface;
   E. means to guide movement of said slide member and segment into and out of electrical engagement with said contacts on sliding movement of said slide member between a first position and a second position;
   F. said contacts being intermediate said positions in the slide path with corresponding portions adjacent the spaced contacts being spaced from one another a distance along the path of travel slightly less than the span of the segment along the slide path;
   H. stop means cooperating between the slide surface and member and adjacent said second position, said stop means being spaced from the adjacent electrical contact a distance such that when the slide member is in engagement with said stop means, the segment is in electrical engagement with said adjacent electrical contact;
   I. lead wires extending from each of said contacts and adapted to be electrically connected to a current source means characterized by a predetermined voltage;
   J. electrical lead wire means connecting said segment and adapted for connecting to an electrical unit to be driven by direct current;
   K. balance circuit means electrically interconnecting said pool and the contact adjacent said first position;
   L. said contact adjacent said first position being spaced from said first position a distance greater than the span of the pool along the slide path; and
   M. whereby direct current flow may be initiated by a movement of the slide member and controlled by movement of said slide member toward said second position from contact to contact.

15. An electrical control unit comprising:
   A. a cylinder defining a cylinder column of non-conductive material closed at one end and having a through hole at the other end,
   B. a piston rod having one end at all times exterior of the cylinder and snugly extending through said hole;

C. a piston head, sized for snug reciprocal movement within the cylinder and of insulated material connected to said rod in said cylinder;
D. a recess in the surface of the head confronting the cylinder,
E. a pool of electrically conductive liquid in the recess, and having a portion comprising part of the surface of the side wall of the head;
F. wiper means included in the head and captivating the pool to contrain it to movement with the piston head and to avoid dispensing thereof from the head,
G. a plurality of fixed and separate contacts in the the wall of said cylinder, axially spaced with respect to one another, and comprising part of the surface of the cylinder column,
H. means limiting and guiding the piston head to travel between a first position with the pool out of engagement with any of the contacts and a second position with the pool in contact with the contact farthest from the first position, and permitting movement of the pool between said positions and into and out of engagement serially with said contacts;
I. said pool being sized relative to said contacts, such that the axial dimension of the pool is as great as the distance between corresponding parts of adjacent contacts;
J. circuit means connecting the contacts with an energy source means for current flow of a different voltage to each contact; and
K. a conductive circuit connected to the pool and extending exteriorly of the cylinder to connect to a unit to be driven by energy of variable voltage requirement to control current flow dependant on the location of the pool in the cylinder.

16. Current control means comprising:
A. a slide smooth surface of non-conductive material, and a plurality of separate, spaced, electrical contacts arranged at fixed locations on said slide surface between a first and a second position defining a slide path therebetween and with said contacts comprising portions of said smooth slide surface;
B. a movable contact comprising a slide member having a main non-conductive surface;
C. said non-conductive surface of said slide member having an electrically conductive pool comprising a part of the slide member surface and being flush with said main non-conductive surface;
D. said slide member including wiper means captivating and constraining said pool to movement with said slide member and avoiding dispensing thereof from the head;
E. means constraining the slide member to engagement of the pool with said slide surface on movement of the slide member;
F. means to guide movement of said slide member and captivated pool into and out of electrical engagement with said contacts on sliding movement of said slide member between said first position and said second position;
G. said contacts being intermediate said positions in the slide path with corresponding portions adjacent the spaced contacts being spaced from one another a distance along the path of travel less than the span of the pool along the slide path;
H. stop means cooperating between the slide surface and member and adjacent said second position, said stop means being spaced from the adjacent electrical contact a distance such that when movement of the slide member is restricted by said stop means, the pool is in electrical engagement with said adjacent electrical contact;
I. lead wires extending from each of said contacts and adapted to be electrically connected to a current source means characterized by a predetermined voltage;
J. electrical lead wire means connecting said pool and adapted for connecting to an electrical unit to be driven by direct current;
K. said contact adjacent said first position being spaced from said first position a distance greater than the span of the pool along the slide path; and
L. whereby direct current flow may be initiated by a movement of the slide member and controlled by movement of said slide member toward said second position from contact to contact.

17. The device as set forth in claim 16 wherein balance circuit means are provided electrically interconnecting said pool and the contact adjacent said first position.

18. The device as set forth in claim 16 wherein said pool comprises an amalgam of thoroughly mixed mercury and silver powder.

19. The device as set forth in claim 18 wherein a mercury coating is provided on said electrical contacts of said slide path.

* * * * *